US012182154B2

(12) United States Patent
Ferraz Nogueira et al.

(10) Patent No.: US 12,182,154 B2
(45) Date of Patent: Dec. 31, 2024

(54) CLONING DATABASE SYSTEM ON VSAM BASED DATASET

(71) Applicant: KYNDRYL, INC., New York, NY (US)

(72) Inventors: Rodolfo Ferraz Nogueira, Campinas (BR); Juscelino Candido, Campinas (BR); Samir de Andrade Yaki, Sao Paulo (BR); Jorge Augusto Senger, Mogi das Cruzes (BR); Fabio Torres Das Candeias, Sao Paulo (BR)

(73) Assignee: Kyndryl, Inc., New York, NY (US)

(*) Notice: Subject to any disclaimer, the term of this patent is extended or adjusted under 35 U.S.C. 154(b) by 13 days.

(21) Appl. No.: 18/064,461

(22) Filed: Dec. 12, 2022

(65) Prior Publication Data

US 2024/0193173 A1 Jun. 13, 2024

(51) Int. Cl.
*G06F 16/25* (2019.01)
*G06F 16/23* (2019.01)
*G06F 16/27* (2019.01)

(52) U.S. Cl.
CPC ........ *G06F 16/254* (2019.01); *G06F 16/2365* (2019.01); *G06F 16/27* (2019.01)

(58) Field of Classification Search
CPC ..... G06F 16/254; G06F 16/2365; G06F 16/27
See application file for complete search history.

(56) References Cited

U.S. PATENT DOCUMENTS

| | | | |
|---|---|---|---|
| 7,933,869 B2 | 4/2011 | Becker et al. | |
| 9,152,659 B2 | 10/2015 | Cline et al. | |
| 9,229,964 B2 | 1/2016 | Stevelinck et al. | |
| 9,323,760 B1* | 4/2016 | Chopra | G06F 16/128 |
| 10,042,908 B2 | 8/2018 | Kuchibhotla et al. | |

(Continued)

FOREIGN PATENT DOCUMENTS

CN 105159908 A 12/2015

OTHER PUBLICATIONS

Anonymous, "Backup and restore methods with FlashCopy® and snapshots", IBM Documentation, URL: https://www.ibm.com/docs/en/sps/8.1.11?topic=SSERFV_8.1.11/fcm.unx/c_fcmu_db2_ovr_bupgranular.html, Retrieved: Jul. 25, 2024, 2 pages.

(Continued)

*Primary Examiner* — Brittany N Allen
(74) *Attorney, Agent, or Firm* — CANTOR COLBURN LLP; Erik Swanson

(57) ABSTRACT

A method for database cloning is provided. The method initiates an outage-free backup of a production database of a source database system using a point-in-time copy technology which copies both data and object structure. The method executes a cloning command to open a dialog panel menu receiving as input a subsystem name used to generate a set of database restore jobs. The method executes the set of database restore jobs to clone data into a transient area. The method uses a copy management service to activate replication of the data from the source database system created using the copy technology to a target database system. The method exports a file catalog associated with the source database system to the target database system. The method executes a script to rename files according to specifications of the target database system and the file catalog.

19 Claims, 5 Drawing Sheets

(56) References Cited

U.S. PATENT DOCUMENTS

| | | | | |
|---|---|---|---|---|
| 11,176,001 B2* | 11/2021 | Zhang | ............... | G06F 11/1469 |
| 2006/0047720 A1 | 3/2006 | Kulkarni et al. | | |
| 2013/0173542 A1* | 7/2013 | Dudgeon | ............. | G06F 3/0604 |
| | | | | 707/646 |
| 2015/0286433 A1 | 10/2015 | Dain et al. | | |
| 2016/0048522 A1* | 2/2016 | Wilcock | ............... | G06F 16/113 |
| | | | | 707/662 |
| 2016/0259574 A1* | 9/2016 | Carpenter | ............. | G06F 3/0683 |
| 2017/0046232 A1* | 2/2017 | Cadarette | ............... | G06F 3/065 |
| 2021/0019072 A1* | 1/2021 | Marivoet | ............. | G06F 3/0647 |
| 2023/0083038 A1* | 3/2023 | Reed | .................... | G06F 3/0604 |
| | | | | 711/165 |

OTHER PUBLICATIONS

Anonymous, "Cloning databases", IBM Documentation, URL: https://www.ibm.com/docs/en/tsfm/4.1.1?topic=linux-cloning-databases, Retrieved: Jul. 25, 2024, 1 page.

* cited by examiner

CLONING DATABASE SYSTEM ON VSAM BASED DATASET

BACKGROUND

The present invention generally relates to database systems, and more particularly to cloning a database system on a Virtual Storage Access Method (VSAM) based dataset.

Database systems use checkpoint and restore mechanisms to manage their data. However, current solutions involve additional software and labor and are time consuming and require outage (data inaccessibility). Hence, there is a need for a solution that does not require additional software and labor and that is time efficient and avoids the need for outage.

SUMMARY

According to aspects of the present invention, a computer-implemented method for database cloning is provided. The method includes initiating an outage-free backup of a production database of a source database system using a predetermined point-in-time copy technology which copies both data and object structure, responsive to a request to perform a clone of the source database system. The method further includes executing a predetermined cloning command to open a dialog panel menu receiving as input a subsystem name used to generate a set of database restore jobs. The method also includes executing the set of database restore jobs to clone data into a predetermined transient area. The method additionally includes using a predetermined copy management service to activate replication of the data from the source database system created using the predetermined copy technology to a target database system. The method further includes exporting a file catalog associated with the source database system to the target database system. The method also includes executing a predetermined script to rename files according to specifications of the target database system and the file catalog.

According to other aspects of the present invention, a computer program product for database cloning is provided. The computer program product includes a non-transitory computer readable storage medium having program instructions embodied therewith. The program instructions are executable by a computer to cause the computer to perform a method. The method includes initiating, by a hardware processor of the computer, an outage-free backup of a production database of a source database system using a predetermined point-in-time copy technology which copies both data and object structure, responsive to a request to perform a clone of the source database system. The method further includes executing, by the hardware processor, a predetermined cloning command to open a dialog panel menu receiving as input a subsystem name used to generate a set of database restore jobs. The method also includes executing, by the hardware processor, the set of database restore jobs to clone data into a predetermined transient area. The method additionally includes using, by the hardware processor, a predetermined copy management service to activate replication of the data from the source database system created using the predetermined copy technology to a target database system. The method further includes exporting, by the hardware processor, a file catalog associated with the source database system to the target database system. The method also includes executing, by the hardware processor, a predetermined script to rename files according to specifications of the target database system and the file catalog.

According to still other aspects of the present invention, a computer processing system for database cloning is provided. The system includes a memory device for storing program code. The system further includes a processor device, operatively coupled to the memory device, for running the program code to initiate an outage-free backup of a production database of a source database system using a predetermined point-in-time copy technology which copies both data and object structure, responsive to a request to perform a clone of the source database system. The processor device further runs the program code to execute a predetermined cloning command to open a dialog panel menu receiving as input a subsystem name used to generate a set of database restore jobs. The processor device also runs the program code to execute the set of database restore jobs to clone data into a predetermined transient area. The processor device additionally runs the program code to use a predetermined copy management service to activate replication of the data from the source database system created using the predetermined copy technology to a target database system. The processor device further runs the program code to export a file catalog associated with the source database system to the target database system. The processor device also runs the program code to execute a predetermined script to rename files according to specifications of the target database system and the file catalog.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to cloning a database system on a Virtual Storage Access Method (VSAM) based dataset.

Embodiments of the present invention automate backup work and the corresponding organization and treatment of database files and their recovery.

In one or more embodiments of the present invention, all of the work on the clone is done starting from a FLASH-COPY® backup from a source database system. FLASH-COPY® is an IBM® feature supported on storage devices that makes it possible to create copies of data sets. FLASH-COPY® copies both the data and the object structure.

Since a FLASHCOPY® backup is obtained initially, in embodiments of the present invention, the database to be transferred is fully available to a user, even during the cloning process. This is a paramount advantage over prior art approaches to database cloning, as the database does not have to be shut down from access by a user(s). Advantageously, the present invention can be used in different Zero downtime Operating System (Z/OS) architecture environments.

FLASHCOPY® technology allows backups of large data areas (e.g., terabytes) in, for example, a few minutes, thus allowing a quick execution of the cloning process.

Embodiments of the present invention do not require strict size constraints on involved memories and databases. A transient area is used to copy data from a source database system to a target database system where the only requirement is that the transient area is sufficiently sized to store all of the data to be transferred.

Hence, embodiments of the present invention advantageously provide online checkpoint and recovery, and are capable of automatically prepare large enterprise databases which have a high size of tablespace/index.

Figure 1:
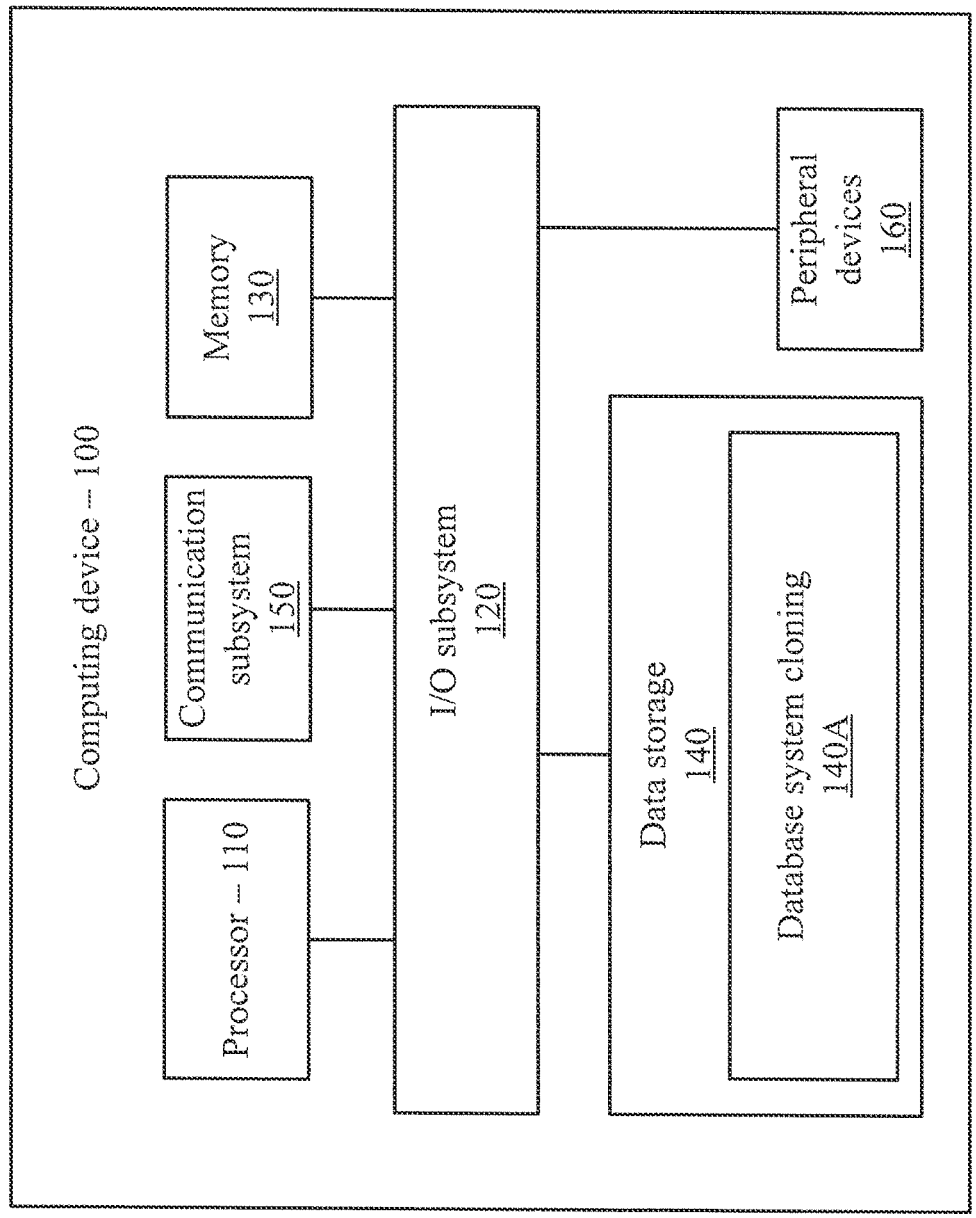
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform database system cloning on a VSAM based data set.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for database system cloning on a VSAM based dataset. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIG. 2). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing elementbased controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
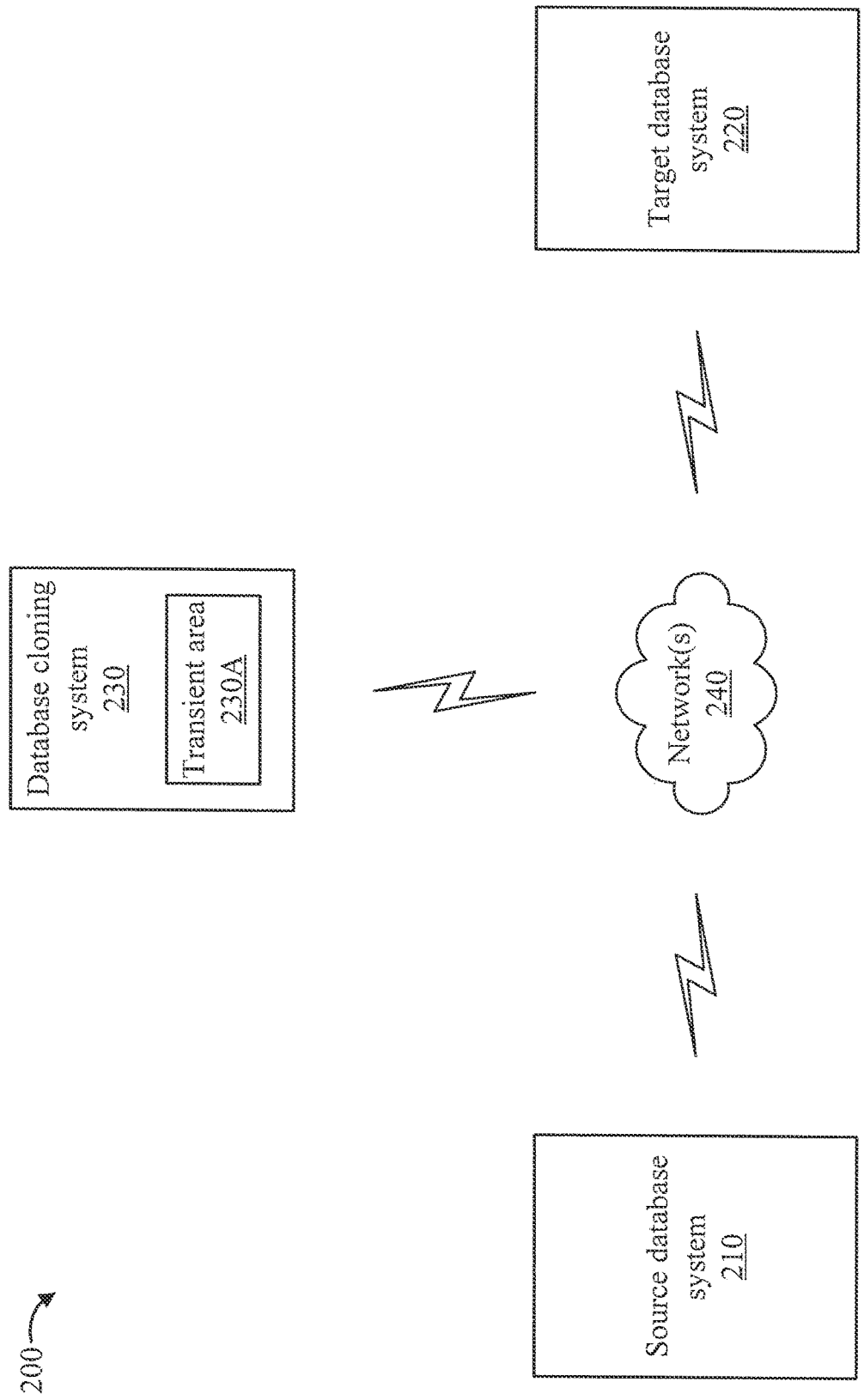
FIG. 2 shows an exemplary computing environment to which the present invention can be applied, in accordance with an embodiment of the present invention.

These and other variations of a hardware processor subsystem are also contemplated in accordance with embodiments of the present invention FIG. 2 shows an exemplary computing environment 200 to which the present invention can be applied, in accordance with an embodiment of the present invention.

The computing environment 200 includes a source database system 210, a target database system 220, and a database cloning system 230. Computing device 100 of FIG. 1 can be embodied by any of the source database system 210, the target database system, and/or the database cloning system 230.

The source database system 210 includes a database 210A to be transferred to the target database system 220 so as to become database 220A on the target database system. The use of a different reference numeral is to reflect the possible differences in the operations of the databases while noting that the underlying data is the same.

The systems 210, 220, and 230 can communicate with each other through any communication means including wired and/or wireless technologies. In the example of FIG. 2, the systems 210, 220, and 230 are connected by way one or more wired networks 240.

In an embodiment, data can be copied from the source database system 210 to the target database system 220 without any outage (downtime). In this way, the data is always accessible. In an embodiment, the data is cloned from a production database of the source database system 210.

The database cloning system 230 includes a transient area 230A, where data to be transferred from the source database system 210 to the target database system 220 is intermittently stored. As such, a size of the transient area is at least as big as necessary to store all of the data and/or database to be transferred from the source database system 210 to the target database system 220.

While shown separate from source database system 210 and target database system 220 in the embodiment of FIG. 2, it is to be appreciated that the database cloning system 230 can be part of any of the source database system 210 and/or the target database system 220 in other embodiments. For example, in a case where one or both of the source and target systems are distributed systems, then the database cloning system 230 can be part of one of the distributed systems. These and other variations to the elements of FIG. 2 are readily contemplated by one of ordinary skill in the art, while maintaining the spirit of the present invention.

It is to be appreciated that in one or more embodiments, the database cloning system 230 can be implemented in the cloud using cloud resources. In this way, cloud resources can be used to facilitate database cloning in accordance with embodiments of the present invention. For example, the transient area can be located in the cloud, thus allowing for clouds services to be provided with respect to cloning.

Figure 3:
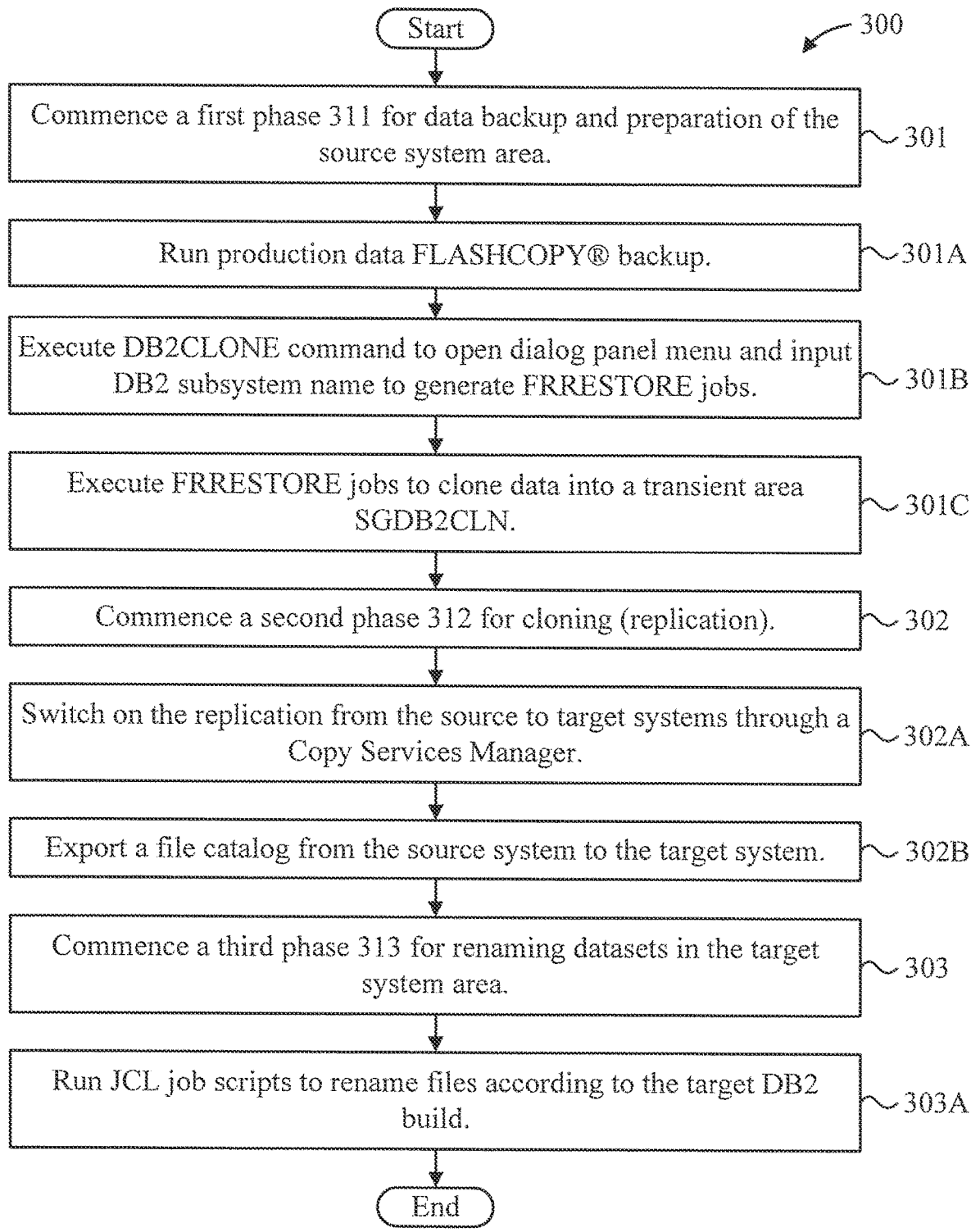
FIG. 3 is a flow diagram showing 3 exemplary phases of a method for database cloning, in accordance with an embodiment of the present invention.

FIG. 3 is a flow diagram showing 3 exemplary phases of a method 300 for database cloning, in accordance with an embodiment of the present invention.

At block 301, commence a first phase 311 for data backup and preparation of the source system area.

In an embodiment, block 301 can include one or more of blocks 301A through 301C.

At block 301A, run production data FLASHCOPY® backup.

At block 301B, execute DB2CLONE command to open dialog panel menu and input DB2 subsystem name to generate FRRESTORE jobs.

At block 301C, execute FRRESTORE jobs to clone data into a transient area SGDB2CLN.

At block 302, commence a second phase 312 for cloning (replication).

In an embodiment, block 302 can include one or more of blocks 302A and 302B.

At block 302A, switch on the replication from the source to target systems through IBM's Copy Services Manager.

At block 302B, export a file catalog from the source system to the target system.

At block 303, commence a third phase 313 for renaming datasets in the target system area.

In an embodiment, block 303 can include block 303A.

At block 303A, run JCL job scripts to rename files according to the target DB2 build.

Figure 4:
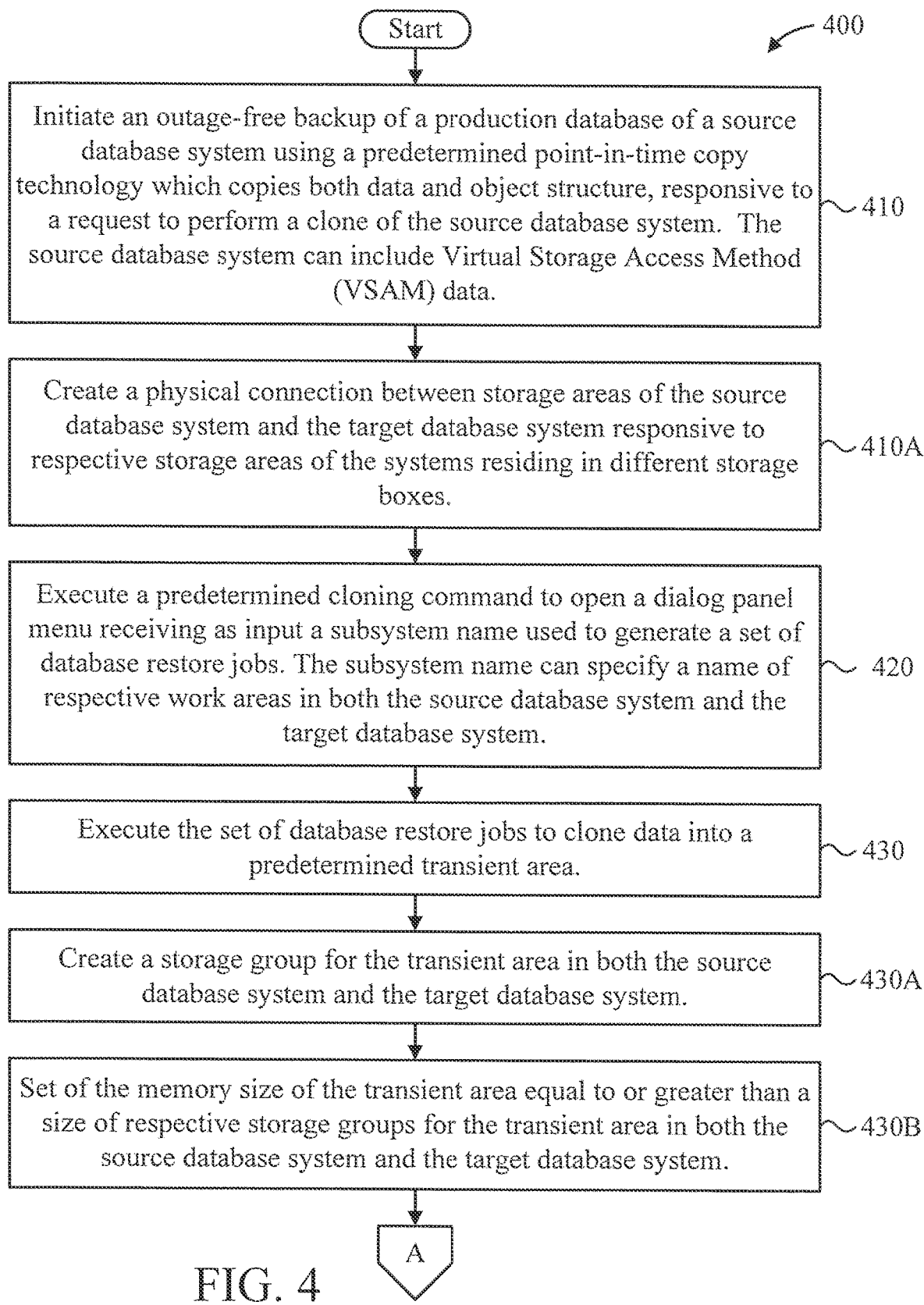
FIGS. 4-5 show an exemplary method for database cloning, in accordance with an embodiment of the present invention.
Figure 5:
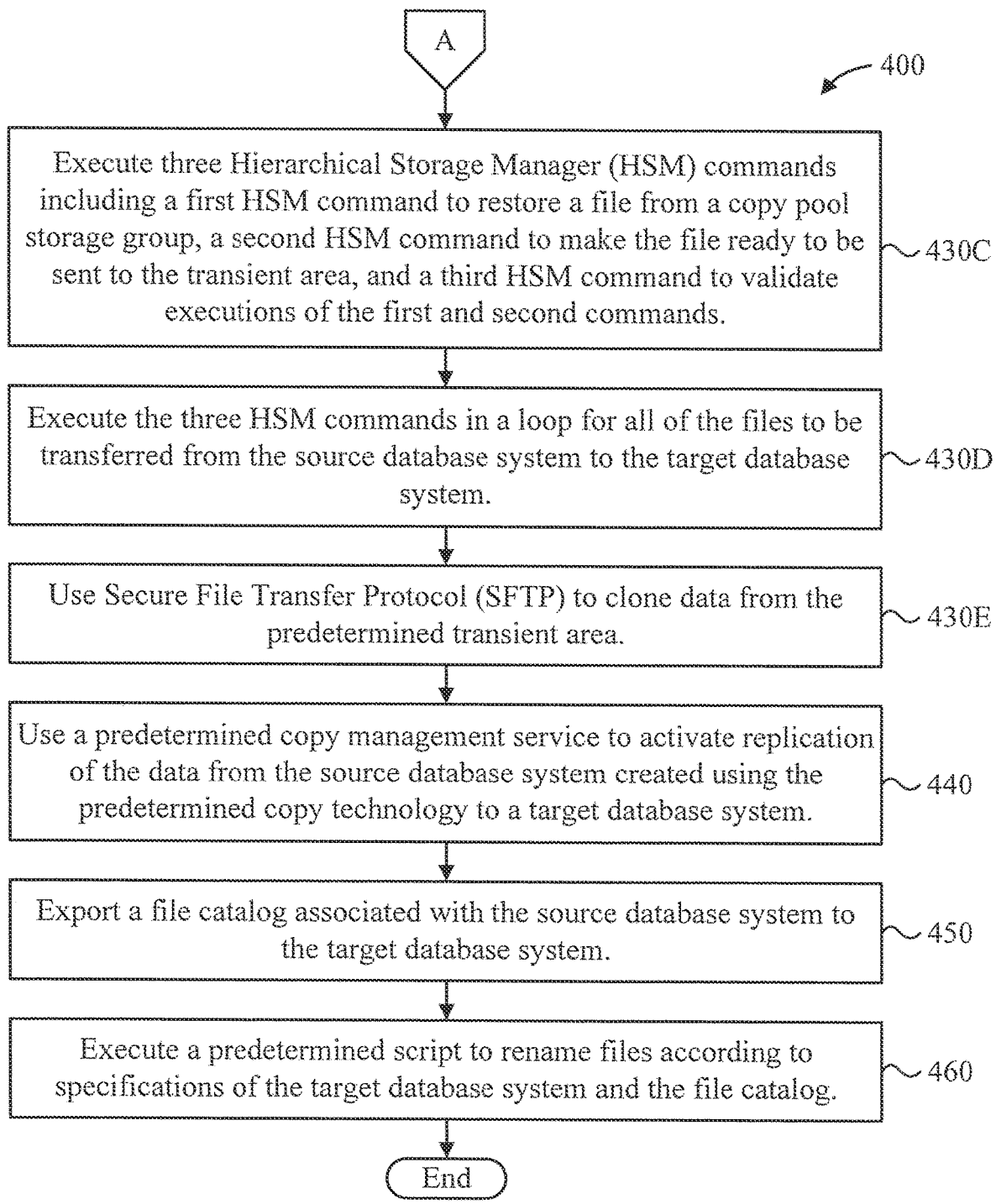

A further description of the preceding three phases is provided with respect to FIGS. 4-5 and the additional description thereafter.

FIGS. 4-5 show an exemplary method 400 for database cloning, in accordance with an embodiment of the present invention. Blocks 401 through 430 correspond to the first phase 311. Blocks 440-450 corresponding to the second phase 312. Block 460 corresponds to the third phase 313. Method 400 can be a time-scheduled method in order to perform database cloning at predetermined times.

At block 410, initiate an outage-free backup of a production database of a source database system using a predetermined point-in-time copy technology which copies both data and object structure, responsive to a request to perform a clone of the source database system. IBM FLASHCOPY® also provides the background Fast Replication Recovery (FRRECOV) function to restore the files in the transient area. In an embodiment, the source database system can include Virtual Storage Access Method (VSAM) data. In an embodiment, FLASHCOPY® can be used as the predetermined copy technology. Of course, the present invention is not limited to the use of FLASHCOPY® and, thus, other copy technologies providing outage-free backup that copies both the data and object structure can also be used while maintaining the spirit of the present invention.

In an embodiment, block 410 can include block 410A.

At block 410A, create a physical connection between storage areas of the source database system and the target database system responsive to respective storage areas of the systems residing in different storage boxes.

At block 420, execute a predetermined cloning command to open a dialog panel menu receiving as input a subsystem name used to generate a set of database restore jobs. In an embodiment, the subsystem name can specify a name of respective work areas in both the source database system and the target database system.

At block 430, execute the set of database restore jobs to clone data into a predetermined transient area.

In an embodiment, block 430 can include one or more of blocks 430A through 430E.

At block 430A, create a storage group for the transient area in both the source database system and the target database system.

At block 430B, set of the memory size of the transient area equal to or greater than a size of respective storage groups for the transient area in both the source database system and the target database system.

At block 430C, execute three Hierarchical Storage Manager (HSM) commands including a first HSM command to restore a file from a copy pool storage group, a second HSM command to make the file ready to be sent to the transient area, and a third HSM command to validate executions of the first and second commands.

At block 430D, execute the three HSM commands in a loop for all of the files to be transferred from the source database system to the target database system.

At block 430E, use Secure File Transfer Protocol (SFTP) to clone data from the predetermined transient area. While SFTP is used in an embodiment, in other embodiments, other protocols can be used to clone data from the predetermined transient area.

At block 440, use a predetermined copy management service to activate replication of the data from the source database system created using the predetermined copy technology to a target database system.

At block 450, export a file catalog associated with the source database system to the target database system.

At block 460, execute a predetermined script to rename files according to specifications of the target database system and the file catalog.

A further description will now be given regarding method 400, in accordance with an embodiment of the present invention.

Method 400 can be considered to include 3 phases. A first phase is for data backup and preparation of the source system area. There is no production outage in the first phase. The second phase is for the cloning process (replication). The cloning process involves replicating data from any source system area into a target system area. The third phase is for renaming datasets in the target system area.

A description will now be given regarding the first phase, in accordance with an embodiment of the present invention.

The method 400 initially starts by checking whether the system is ready for IBM® FLASHCOPY® technology and verifying if uses DS8K box for data storage.

A storage group is created for the transitioning area in both systems (source and target). A suggested exemplary name for this area is SGDB2CLN (Storage Group, DB2, CLoNe). After that, it is required to allocate the number of disks needed to receive DB2 source files. An important point is that the size of your transitioning area must match the size of the database that will be copied, therefore if you have a 5 Terabyte database, proportionally your transitioning area should also include 5 Terabytes.

If the storage area of both systems (source/target) reside in the same DS8K storage box, just configure disk replication using a tool such as IBM® Copy Services Manager (CSM) that runs in the DS8K box. If the source/target storage resides in different boxes, a physical connection is created between both boxes.

A work area including at least 2 default qualifiers named, e.g., DB2.CLONE, should exist on both the source and target systems involved in the cloning process. Those two qualifiers will be the prefix of the cloning tool datasets including the scripts, Job Control Language (JCL) commands and REXX programs to be used in the method 300. JCL is a scripting language that describe jobs to the Operating System (OS) that runs in the IBM® large server (Mainframe) computers. JCL acts as an interface between application programs (COBOL, PL/1, Assembler etc.) and the Mainframe OS (MVS or Z/OS). It is mainly a set of control statements that provide the specifications necessary to run an application program. In mainframe environment, programs can be executed in batch and online modes. JCL is used for submitting a program for execution in batch mode.

The next step is to run a FLASHCOPY® backup of the source production database. A dump is not needed, so make sure only FLASHCOPY® is executed. After the FLASHCOPY® backup is obtained, the cloning process is initiated and a set of developed REXX programs and scripts are executed in order to prepare the database files to be restored.

To call a DB2 clone panel, the user executes a DB2CLONE routine through an ISPF command line. ISPF is a full panel application navigated by keyboard. ISPF includes a text editor and browser, and functions for locating and listing files and performing other utility functions. The first REXX program to run is called ALLOC. This interpreted program will read all the database files that are pre-defined by the user when the DB2 subsystem ID is informed during DB2CLONE panel execution and then the ALLOC program will create the JCL JOB scripts to be executed right away.

Once the user executes the JCL scripts that were generated in the previous step, another REXX program called $FRRECOV will begin execution. This REXX program has been compiled by a Z/OS REXX compiler in order to increase the database files restore performance.

The REXX program $FRRECOV will execute three HSM commands. The first HSM command is Fast Replication Recovery to restore the files from the FLASHCOPY® pool storage group. The second command is an ALTER file storage class to make the file ready to be sent to the transient area, a temporary storage group that is called by default SGDB2CLN for example. The last command is HSM MIGRATE to validate the execution. The REXX program will execute these three commands in a loop for all the files that have been read by the first program.

A description will now be given regarding the second phase, in accordance with an embodiment of the present invention.

When the transient area on the source system has all the database files restored, this means phase number two is ready to be executed. Phase 2 includes replicating the production database files into the receiving target system. As described previously there are many methods available to replicate disks and files. In an exemplary embodiment, this product will utilize IBM® Storage Box DS8K technology and IBM® Copy Services Manager generating a Metro Mirror connection between the source and the target server. It is important that the receiving target server must have all the disks in their transient area offline so the Metro Mirror copy works as designed. Also, during phase 2, there are JCL Job scripts preset as CAT (CAT1DIA, CAT2EXP, CAT3DEF, CAT4IMP, CAT5DSC and CAT6DEL) that will automate the process to do a system catalog export/import between both source and target servers. Such scripts also are part of this product and exist on DB2.CLONE work area datasets, where users can customize as needed.

A description will now be given regarding the third phase, in accordance with an embodiment of the present invention.

Phase number three will initiate after all files have been replicated. IBM® Copy Services Manager, Metro Mirror connection will show a 100% status meaning the replication is complete.

Metro Mirror is a type of remote copy that creates a synchronous copy of data from a primary volume to a secondary volume. A secondary volume can either be on the same system or on another system. With synchronous copies, host applications write to the primary volume but do not receive confirmation that the write operation has completed until the data is written to the secondary volume. This ensures that both the volumes have identical data when the copy operation completes. After the initial copy operation completes, the Metro Mirror function maintains a fully synchronized copy of the source data at the target site at all times.

Phase number three is supposed to be quick since the user only needs to vary all the disks in the target transient area SGDB2CLN storage group online to make the files available. However, before executing the final steps, it is very important that the file catalog from the production server has already been imported into the target server. The product also provides job scripts written in JCL language to import the file catalog and rename the files accordingly, using your database high level qualifier. Once the database files have been renamed, the target system is ready to start the brand new DB2 Database installation instance.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for database cloning, comprising:
    initiating an outage-free backup of a production database of a source database system using a predetermined point-in-time copy technology which copies both data and object structure, responsive to a request to perform a clone of the source database system while allowing data access to the source database system;
    executing a predetermined cloning command to open a dialog panel menu receiving as input a subsystem name used to generate a set of database restore jobs;
    executing the set of database restore jobs to clone data into a predetermined transient area while allowing data access to the source database system, the set of database restore jobs including at least three Hierarchical Storage Manager (HSM) commands, the at least three HSM commands comprising a first HSM command to restore a file from a copy pool storage group, a second HSM command to make the file ready to be sent to the predetermined transient area, and a third HSM command to validate executions of the first and second commands;
    using a predetermined copy management service to activate replication of the data from the source database system created using the predetermined point-in-time copy technology to a target database system;
    exporting a file catalog associated with the source database system to the target database system; and
    executing a predetermined script to rename files according to specifications of the target database system and the file catalog while allowing data access to the source database system.

2. The computer-implemented method of claim 1, wherein executing the set of database restore jobs comprises creating a storage group for the predetermined transient area in both the source database system and the target database system.

3. The computer-implemented method of claim 1, wherein the predetermined transient area has a memory size equal to or greater than a size of respective storage groups for the predetermined transient area in both the source database system and the target database system.

4. The computer-implemented method of claim 1, further comprising creating a physical connection between storage areas of the source database system and the target database system responsive to respective storage areas of the systems residing in different storage boxes.

5. The computer-implemented method of claim 1, wherein the three HSM commands are executed in a loop for all of the files to be transferred from the source database system to the target database system.

6. The computer-implemented method of claim 1, further comprising setting respective work areas in the source database system and the target database system to copy from and to, respectively, wherein files are copied from a work area of the source database system to the predetermined transient area and from the predetermined transient area to a work area of the target database system.

7. The computer-implemented method of claim 1, wherein the subsystem name specifies a name of respective work areas in both the source database system and the target database system.

8. The computer-implemented method of claim 1, wherein the source database system comprises Virtual Storage Access Method (VSAM) data.

9. The computer-implemented method of claim 1, wherein data from the predetermined transient area is cloned using Secure File Transfer Protocol (SFTP).

10. The computer-implemented method of claim 1, wherein the method is a time scheduled method for automatic cloning.

11. The computer-implemented method of claim 1, wherein the predetermined transient area is comprised in a system selected from the group consisting of the source database system and the target database system.

12. The computer-implemented method of claim 1, wherein the predetermined transient area is comprised in a database cloning system separate from and operatively connected to both the source database system and the target database system.

13. A computer program product for database cloning, the computer program product comprising a non-transitory computer readable storage medium having program instructions embodied therewith, the program instructions executable by a computer to cause the computer to perform a method comprising:
- initiating, by a hardware processor of the computer, an outage-free backup of a production database of a source database system using a predetermined point-in-time copy technology which copies both data and object structure, responsive to a request to perform a clone of the source database system while allowing data access to the source database system;
- executing, by the hardware processor, a predetermined cloning command to open a dialog panel menu receiving as input a subsystem name used to generate a set of database restore jobs, the set of database restore jobs including at least three Hierarchical Storage Manager (HSM) commands, the at least three HSM commands comprising a first HSM command to restore a file from a copy pool storage group, a second HSM command to make the file ready to be sent to the predetermined transient area, and a third HSM command to validate executions of the first and second commands;
- executing, by the hardware processor, the set of database restore jobs to clone data into a predetermined transient area while allowing data access to the source database system;
- using, by the hardware processor, a predetermined copy management service to activate replication of the data from the source database system created using the predetermined point-in-time copy technology to a target database system;
- exporting, by the hardware processor, a file catalog associated with the source database system to the target database system; and
- executing, by the hardware processor, a predetermined script to rename files according to specifications of the target database system and the file catalog while allowing data access to the source database system.

14. The computer program product of claim 13, wherein the three HSM commands are executed in a loop for all of the files to be transferred from the source database system to the target database system.

15. The computer program product of claim 13, wherein the subsystem name specifies a name of respective work areas in both the source database system and the target database system.

16. The computer program product of claim 13, wherein the source database system comprises Virtual Storage Access Method (VSAM) data.

17. The computer program product of claim 13, wherein data from the predetermined transient area is cloned using Secure File Transfer Protocol (SFTP).

18. A computer processing system for database cloning, comprising:
- a memory device for storing program code; and
- a processor device, operatively coupled to the memory device, for running the program code to:
  - initiate an outage-free backup of a production database of a source database system using a predetermined point-in-time copy technology which copies both data and object structure, responsive to a request to perform a clone of the source database system while allowing data access to the source database system;
  - execute a predetermined cloning command to open a dialog panel menu receiving as input a subsystem name used to generate a set of database restore jobs, the set of database restore jobs including at least three Hierarchical Storage Manager (HSM) commands, the at least three HSM commands comprising a first HSM command to restore a file from a copy pool storage group, a second HSM command to make the file ready to be sent to the predetermined transient area, and a third HSM command to validate executions of the first and second commands;
  - execute the set of database restore jobs to clone data into a predetermined transient area while allowing data access to the source database system;
  - use a predetermined copy management service to activate replication of the data from the source database system created using the predetermined point-in-time copy technology to a target database system;
  - export a file catalog associated with the source database system to the target database system; and
  - execute a predetermined script to rename files according to specifications of the target database system and the file catalog while allowing data access to the source database system.

19. The computer-implemented method of claim 1, wherein executing the set of database restore jobs to clone data into a predetermined transient area comprises cloning data to a plurality of offline disks in the predetermined transient area.

* * * * *